US011121879B2

(12) United States Patent
Bianzino et al.

(10) Patent No.: US 11,121,879 B2
(45) Date of Patent: Sep. 14, 2021

(54) COMPUTER IMPLEMENTED METHOD FOR AUTOMATICALLY CERTIFYING DOCUMENTS WITH INTEGRITY AND AUTHENTICITY GUARANTEES AND COMPUTER PROGRAMS THEREOF

(71) Applicant: TELEFONICA DIGITAL ESPANA, S.L.U., Madrid (ES)

(72) Inventors: Aruna Prem Bianzino, Madrid (ES); Carmen Torrano Gimenez, Madrid (ES); Rames Sarwat, Madrid (ES); Salvador Sanchez Taboada, Madrid (ES)

(73) Assignee: TELEFONICA CYBERSECURITY & CLOUD TECH S.L., Madrid (ES)

( * ) Notice: Subject to any disclaimer, the term of this patent is extended or adjusted under 35 U.S.C. 154(b) by 259 days.

(21) Appl. No.: 15/928,705

(22) Filed: Mar. 22, 2018

(65) Prior Publication Data
US 2018/0278423 A1    Sep. 27, 2018

(30) Foreign Application Priority Data

Mar. 24, 2017    (EP) .................................... 17382148

(51) Int. Cl.
*H04L 9/32* (2006.01)
*G06F 21/64* (2013.01)
(Continued)

(52) U.S. Cl.
CPC ............ *H04L 9/3236* (2013.01); *G06F 21/16* (2013.01); *G06F 21/645* (2013.01);
(Continued)

(58) Field of Classification Search
CPC ... H04L 9/3236; H04L 9/0861; H04L 9/0894; H04L 9/3297; H04L 9/08; H04L 9/2906;
(Continued)

(56) References Cited

U.S. PATENT DOCUMENTS 8,316,237 B1 *  11/2012  Felsher .................. H04L 29/06
                                                            713/171
10,594,689 B1 *   3/2020  Weaver ................. G10L 19/018
(Continued)

FOREIGN PATENT DOCUMENTS

| KR | 10-2008-0014194 A | 2/2008 |
| WO | 2008/108861 A1 | 9/2008 |
| WO | 2016/160850 A1 | 10/2016 |

OTHER PUBLICATIONS

Nasr Addin Ahmed Salem Al-Maweri et al., State-of-the-Art in Techniques of Text Digital Watermarking: Challenges and Limitations, 2016, Journal of Computer Sciences, vol. 12, No. 2, pp. 62-80 (Year: 2016).*

(Continued)

*Primary Examiner* — Jeffrey D. Popham
(74) *Attorney, Agent, or Firm* — Sughrue Mion, PLLC

(57) ABSTRACT

A computer implemented method for automatically certifying documents with integrity and authenticity guarantees and computer programs thereof.
The method comprising: receiving, by a second computer (20), a document ($D_o$) to be certified, identifying it with metadata and computing a first cryptographic function ($h_o$); sending, by the second computer (20), the first cryptographic function ($h_o$) to a third computer (30) hold within a distributed ledger; receiving, by the second computer (20), a message digest ($h_{ro}$) corresponding to an identifier of having stored the first cryptographic function ($h_o$) in the third computer (30); computing, by the second computer (20), a key (K), said computed key (K) being decoded into a watermark, which is applied to the document ($D_o$) providing a modified document ($D_w$); sending, by the second computer (20), the modified document ($D_w$) to the first computer system (10); computing, by the second computer (20), a second cryptographic function ($h_w$), and sending it and the (Continued)

modified document ($D_w$) to the third computer (30); the second computer (20) receiving a message digest ($h_{rw}$) corresponding to an identifier of having stored the ($h_w$) and ($D_w$).

10 Claims, 3 Drawing Sheets

(51) Int. Cl.
*G06F 21/16* (2013.01)
*H04L 9/08* (2006.01)

(52) U.S. Cl.
CPC .......... *H04L 9/0861* (2013.01); *H04L 9/0894* (2013.01); *H04L 9/3297* (2013.01); *G06F 2221/2151* (2013.01)

(58) Field of Classification Search
CPC .......... H04L 9/3247; H04L 9/321; H04L 9/32; G06F 21/64; G06F 21/16; G06F 21/645; G06F 2221/2151; G06F 16/93; G06F 16/2379; G06F 16/2365; G06F 2201/84; G06F 11/1451
See application file for complete search history.

(56) References Cited

U.S. PATENT DOCUMENTS

| | | |
|---|---|---|
| 2008/0022111 A1 | 1/2008 | Dieti |
| 2009/0193259 A1 | 7/2009 | Miyazaki et al. |
| 2010/0122348 A1 | 5/2010 | Young |
| 2014/0049802 A1 | 2/2014 | Santos et al. |
| 2016/0182237 A1* | 6/2016 | Almgren ............... H04L 9/3247 713/155 |
| 2016/0292396 A1* | 10/2016 | Akerwall ................ G06F 21/10 |
| 2018/0121635 A1* | 5/2018 | Tormasov ............... G06F 21/16 |

OTHER PUBLICATIONS

Alain Brenzlkofer, "Decentralized Trusted Timestamping", URL;https://wwwi scs.ch/blog/wp-content/uploads/2017/01/trusted-sensor-whitepaper.pdf, Jan. 27, 2017, pp. 1/5-5/5.

Hong-Jie He, et al., "Block-Chain Based Fragile Watermarking Scheme with Superior Localization", Network and Parallel Computing, May 19, 2008, pp. 147-160.

"Trusted timestamping", URL:https://en.wikipedia.Org/w/index.php?title=Trusted_timestamping&oldid-769943388, Mar. 12, 2017, pp. 1-5.

"GitHub—A Anonymous; newel 1-purdue/bitstamper; BitStamper, utility for provable timestamps by leveraging Bitcoin", URL:https://github.com/newell-purdue/bitstamper, Apr. 24, 2013, pp. 1-2.

European Search Report for EP 17 38 2148.9 dated Jul. 27, 2017.

* cited by examiner

COMPUTER IMPLEMENTED METHOD FOR AUTOMATICALLY CERTIFYING DOCUMENTS WITH INTEGRITY AND AUTHENTICITY GUARANTEES AND COMPUTER PROGRAMS THEREOF

FIELD OF THE INVENTION

The present invention generally relates to authenticity and integrity of documents. In particular, present invention relates to a computer implemented method, and also to computer programs, for automatically certifying documents with integrity and authenticity guarantees.

BACKGROUND OF THE INVENTION

When a user or an entity is dealing with a document, being it in paper or digital form, they face a common problem: verifying the authenticity and integrity of the document. The authenticity of a document or certificate relates to the fact that it has actually been emitted by its emitting entity on the stated date. On the other hand, the integrity of a document or certificate relates to the fact that it has not been edited after its emission (added/removed/altered text).

Different practices are currently used to check whether a document is authentic and has not been edited since its emission (i.e., integrity). All of them present limitations.

Documents may come with an Administrative Reference Code, by which a service may provide the emission date of the document as well as its issuer (to check the document authenticity) or the whole document (authenticity and integrity). The latter case is prone to data leak, while the first does not guarantee integrity. Furthermore, in both cases, human intervention is always needed to compare the emission date and/or the whole document with the original one, making the system prone to eventual human error.

Some patent applications are known in the field, for instance:

US-A1-20140049802 describes a system which is based on the generation of encoded image ETCODE using steganographic techniques, to be printed with the document, using conventional printers. The decoding is performed by a digital camera portable device, obtaining therefore the information hidden in ETCODE, and then confronted with the information about the document in its digital version present in a database. The described solution does not rely on a trusted third party nor it describes how the comparison between the presented copy and the stored copy of the document is performed and whether it is available both for digital and digitalized documents, or not.

WO 2008108861 describes a method for processing electronic documents, such as electronic invoices, specifications, or contracts, to ensure authenticity, integrity, confidentiality, and non-repudiation of the document. A third party service provider is established as the agent for two interacting parties. The third party service provider receives an electronic document from a first party, the electronic document relating to a transaction between the parties, the transaction being, for example, a sale or a contract. The third party service provider provides an electronic signature and certification for the document and archives the document, providing it, along with the certification, to the second party or others. The described solution only works for digital documents and not for digitalized documents, for which no guarantee is offered. Furthermore, the solution relies on digital certificates, suffering of the same limitations.

KR 1020080014194 describes an electronic document repository system that includes an authentication module, a registration module, a reading module, an issuing module and a certificate module. The authentication module is connected to a user terminal through a network, secures authenticity of electronic documents, performs user authentication through a log-in process when a user accesses the electronic document repository system. The registration module checks an electronic document information package transmitted from the user, generates metadata, adds authentication information to the metadata and stores the metadata in a database. The reading module generates a reading information package and transmits the reading information package to the user when the user wants to read an electronic document. The issuing module generates an issuing information package and transmits the package to the user when the user requests the issuing module to issue an electronic document. The certification module issues a certificate for the electronic document or verifies an issued certificate. Contrary to present invention, this solution only provides document issuing and retrieving functionalities, providing documents with embedded metadata for authenticity check on the user side, but it does not allow to automatically check the authenticity and integrity of a carried document: it only allows a manual comparison of a carried document with the digital copy obtained from the repository, in order to verify the document authenticity and integrity.

US-A1-20090193259 describes a solution to store documents and check their authenticity. The solution relies on a hash of the document, fixed to the document itself with a digital signature. The solution only considers digital documents, and not digitalized ones. Moreover, this solution includes the digest of the hash in a visible fashion inside the document, and not in an unappreciable fashion as described in present invention. Furthermore, the solution does not allow including into the document metadata, but only a hash of the document itself. Furthermore, no details are disclosed on how the document hash is computed, or on how the documents are stored in an unalterable way.

US-A1-20100122348 A1 describes a solution to digitalize documents and store them in a repository to check their authenticity on the basis of a mark applied to the digital version. The mark is a combination of the issuer and stored marks. Contrary to present invention, this solution only considers digitalized documents and not native digital ones. The described solution includes a visible mark in the document. As such, it only guarantees the document integrity on a manual comparison. Furthermore, the included mark does not allow storing metadata. Finally, no details are disclosed on how the document is stored in an unalterable way on the storing side.

More solutions are therefore needed to assure integrity and authenticity and also proof of existence of digital or digitalized documents or certificates.

DESCRIPTION OF THE INVENTION

Embodiments of the present invention provide according to an aspect a computer implemented method for automatically certifying documents with integrity and authenticity guarantees, the method first comprises receiving, by a second computer system, from a first computer system (issuer), at least one document (a digital document, e.g., a PDF) to be certified, the at least one document being identified in the second computer system with metadata at least including an identifier of the first computer system and a timestamp. Then, the second computer system computes a first cryptographic function (e.g., a hash function) of the received document and sends the computed first cryptographic function to a third computer system hold within a distributed ledger such as a DLT, the third computer system storing the first cryptographic function in at least one memory thereof. Then, the second computer system receives a first message digest corresponding to an identifier of having stored the first cryptographic function in the third computer system. Following, in the proposed method, the second computer system computes a key using the received first message digest and said metadata of the document, said computed key being decoded into a watermark (i.e., an alteration of the document that may include an identifying image or pattern, such as character spacing or character deformation in the case of text, or pixel shifting in frequency or space in the case of images) which is applied to the document providing a modified document. The modified document is sent by the second computer system to the first computer system to be stored. The second computer system next computes a second cryptographic function of the modified document and sends the computed second cryptographic function and the modified document to the third computer system for storage thereof. Finally, the second computer system receives a second message digest corresponding to an identifier of having stored the second cryptographic function in the third computer system, and stores it locally.

By DLT it has to be understood a consensus of replicated, shared, and synchronized digital data geographically spread across multiple sites, countries, or institutions. There is no central administrator or centralized data storage. As a consequence, the system results fault tolerant and universal (i.e., can be adopted independently of the geographical location). A peer-to-peer network is required as well as consensus algorithms to ensure replication across nodes is undertaken. A Block chain is a possible implementation of the DLT.

According to an embodiment, the watermark is replicated in different points of the modified document allowing hence to check for the authenticity of the document or even for the authenticity of a portion of the document, if it has been damaged (i.e., a broken document, where a part is missing, or dirty/crumpled paper document, etc.). Preferably, the watermark is configured to be indistinguishable to a human eye, while can be identified at a digital inspection.

According to the proposed method, the modified document can be sent, by the first computer system, to a user upon the latter having been validly authenticated.

According to a first embodiment, the second computer system receives a digital document from the user and further extracts the watermark from the received digital document and decodes from it the key, and recovers the second cryptographic function from the third computer system by providing to the latter the second message digest.

Then, the second computer system extracts the metadata of the document from the key, computes a third cryptographic function of the digital document and compares the third cryptographic function with the second cryptographic function that has recovered from the third computer server. Finally, the second computer system informs the user of a result of said comparison and also sends metadata to the latter.

The recovering of the second cryptographic function and the extraction of the metadata can be performed at the same time.

According to a second embodiment, the second computer system receives a digitalized document (e.g., a scan/picture of a digital document previously printed to paper or the conversion to a different digital format of a digital document) from the user and further extracts the watermark from the received digitalized document decoding from it the key. Then, the second computer system, extracts the metadata of the document, including the identifier of the first computer system and the timestamp from the key, and the first message digest from the key, and uses the first message digest to recover the first cryptographic function from the third computer system in order to check the document existence and registration. Finally, the second computer system sends a response to the user about the existence and registration of the document in the third computer system and the extracted metadata for further authenticity check by the user.

The extraction of the metadata and the extraction of the first message digest can be performed at the same time.

According to a third embodiment, the second computer system authenticates identification information of the user and upon said authentication is confirmed the second computer system receives a digitalized document from the user. Then, the second computer system extracts the watermark from the received digitalized document and decodes from it the key, using the second message digest to recover the modified document from the third computer system. Following, the second computer system, extracts the metadata of the received digital document including the identifier of the first computer system and the timestamp from the key. Finally, the second computer system, sends to the user the extracted metadata so that (s)he can verify the authenticity of the document, and also sends to him/her the recovered modified document so that (s)he can check its integrity.

Other embodiments of the invention that are disclosed herein include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Present invention guarantees:

Document integrity, i.e., guarantee that a document has not been altered since its emission;

Document authenticity, meaning that the origin of a document can be univocally identified;

Proof of existence, meaning that it is possible to identify the time reference when the document existed;

Non-repudiation in origin, meaning that the issuer of a document cannot repudiate being the originator of such document;

Confidentiality, i.e., only the issuer and the receiver can access to the original document as stored in the repository, after successful authentication (while any user carrying the document can access to the authenticity and proof of existence info about the carried document). Furthermore, the applied watermark is not appreciable at human inspection, resulting hence secure with respect to external observers and human errors in transcription in contrast to the Administrative Reference Code for example, that is visible and then insecure;

Robustness, meaning that the above guarantees last also in case of damaged or partial documents, as well as both in case of digital and digitalized documents.

Furthermore, the provided guarantees are based on a distributed ledger infrastructure, being hence:

Everlasting, meaning that the stored information cannot be edited or delated in time;

Robust: as the infrastructure is distributed, the resulting is fault tolerant;

Universal, meaning that it can be accessed independently on the geographical location.

Finally, present invention is based on a trusted third party, guaranteeing hence:

Neutrality with respect to the document storage and characteristics.

Accessibility, meaning that the solution is accessible also by private issuers and not only by Public Administrations implementing it.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF THE INVENTION

Present invention allows to guarantee the integrity and authenticity of a document in an automatic and real time fashion, while also guaranteeing the proof of existence in time of the checked document, the non-repudiation from the document issuer, the confidentiality of the document, a universal access to the solution, in space and time, the solution neutrality with respect to the issuer and user, and the robustness of the solution to document damages.

Figure 1:
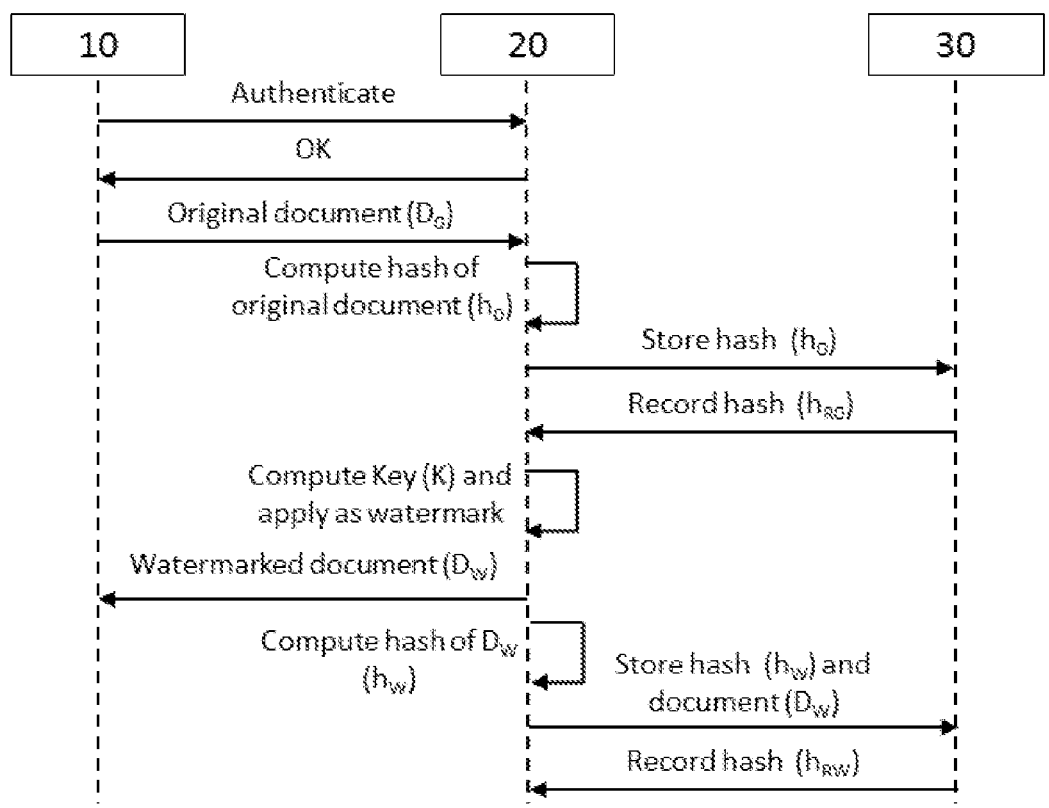
FIG. 1 is a sequence diagram of document registration by an issuer or first computer system.

When a document is emitted by an authorized issuer (or first computer system as termed in the claims) 10, i.e., an entity (private or public) authorized to issue documents and store them using the proposed method, (FIG. 1), before it is delivered to the final user 1; the issuer 10 registers the document in the target system. As a first step for the document registration, the issuer 10 sends the digital document to the target system (or second computer system as termed in the claims 20. Only authorized issuers can send documents to the target system 20. Their authorization is guaranteed by a proper authentication system. The limitation of the issuer 10 prevents the emission of false documents on behalf of other issuers, while the everlasting and unalterable nature of a distributed ledger system such as a DLT 30 guarantees the proof of existence of the document and the non-repudiation of the same on the issuer 10 side.

Once an original document $D_0$ is received by the target system 20, a first cryptographic function such as a hash function of the document $h_0$ is computed and stored in the DLT 30. Each time the first cryptographic function is stored in a DLT 30, a first digest is returned (record hash—$h_{RO}$). The returned first digest is combined with the identifier of the issuer 10, the timestamp and eventual other metadata to create a key K, which is decoded into a watermark to be applied to the original document, as well as for future checks on the document authenticity. The document obtained after the application of the watermark $D_W$ (i.e., the modified document) is returned to the issuer 10 to be delivered to the final user 1. Furthermore, a second cryptographic function, such as a hash function of the modified document $D_W$ is computed and stored in the DLT 30 for future integrity check; together with the modified document $D_W$ itself.

According to the proposed method, the watermark applied to the document consists of a special watermark representing a code (key K) and replicated in different points of the document itself, allowing hence checking for the authenticity of the document or even for the authenticity of a portion of the document, if it has been damaged. The watermark, furthermore, cannot be appreciated by a human inspection, guaranteeing hence security against external observers, as well as robustness to human errors.

Figure 2:
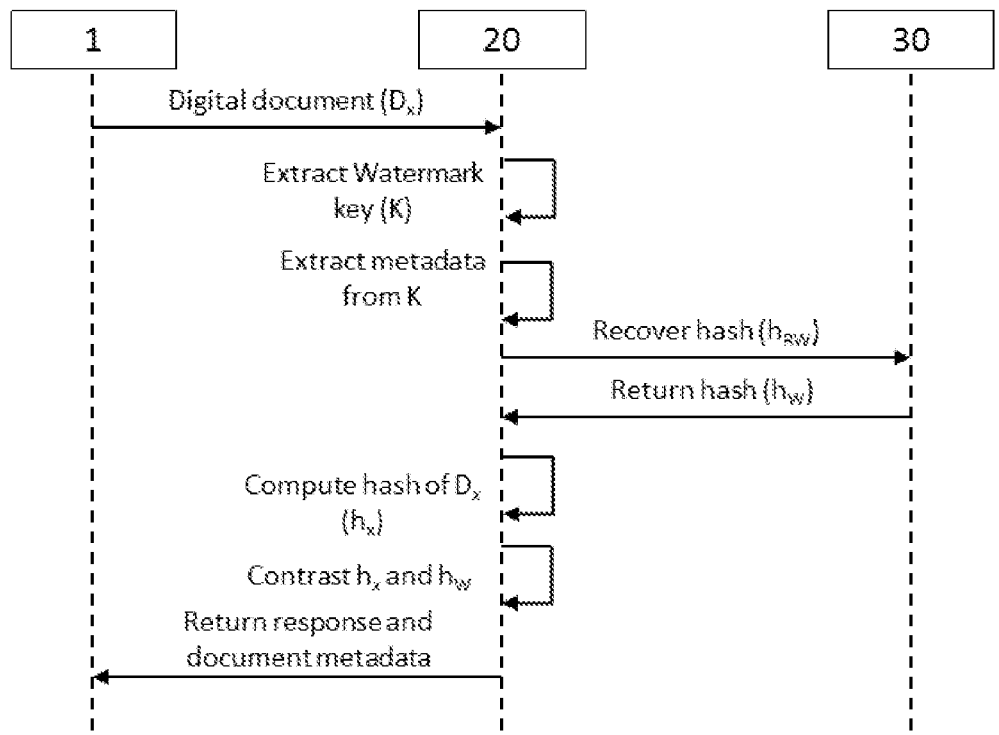
FIG. 2 is a sequence diagram of integrity and authenticity check by a user for a digital document.

Any final user 1 may, according to a first embodiment, verify anytime the authenticity and integrity of a digital document in their possession—given that the original document has been registered using the described solution—by sending it to the described target system 20 (FIG. 2). When a digital document $D_X$ is received by the target system 20, the latter extracts the watermark from the received document $D_X$ and decodes from it the key K. Then the digest of the second cryptographic function is used to retrieve from the DLT 30 the second cryptographic function $h_W$ of the document deposited by the issuer 10. Preferably, at the same time, the document metadata is extracted from the key K. A third cryptographic function such as a hash function of the received document $h_X$ is computed by the target system 20 and contrasted against the stored second cryptographic function $h_W$. If the contrast is positive (i.e. if they are equal), a positive answer of authenticity and integrity of the document is returned to the final user 1, otherwise a negative answer is returned. Furthermore, metadata about the document and the issuer 10 is returned to the final user 1.

Figure 3:
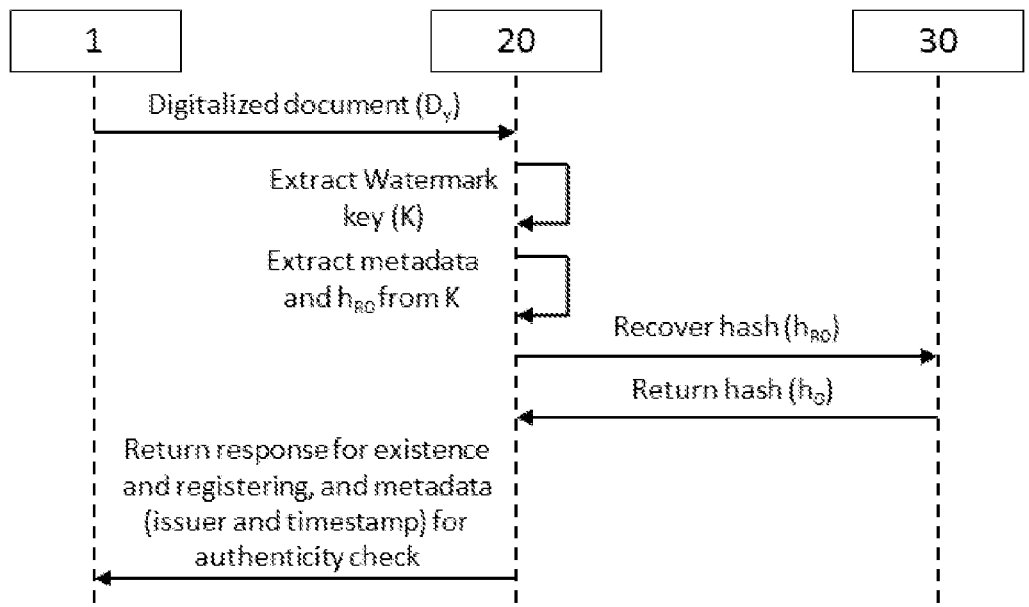
FIG. 3 is a sequence diagram of the authenticity check by a user for a digitalized document.

In a similar way, any final user may, according to a second embodiment, verify anytime the authenticity of a paper or digitalized document (photo, scan, format conversion)—given that the original document has been registered using the described target system 20—by sending the digitalized document to the latter (FIG. 3). When a digitalized document $D_y$ is received by the target system 20, the latter extracts the watermark from it and decodes from it the key K. Then the document metadata is extracted from the key, including the issuer identifier, the registration timestamp and eventual other metadata included at the moment of the registration of the original document $D_0$. Preferably, at the same time, the first digest $h_{RO}$ is extracted from the key K. Besides, the firs digest $h_{RO}$ is used to recover the first cryptographic function $h_o$ from the third computer system 30 in order to check the document existence and registration. The obtained metadata is then returned to the final user 1 for authenticity check of the issuer 10 identity, issuing timestamp and eventual other included check items. This second check on the user side avoids the possibility of reusing a valid original digest $h_{RO}$ on fake documents.

Figure 4:
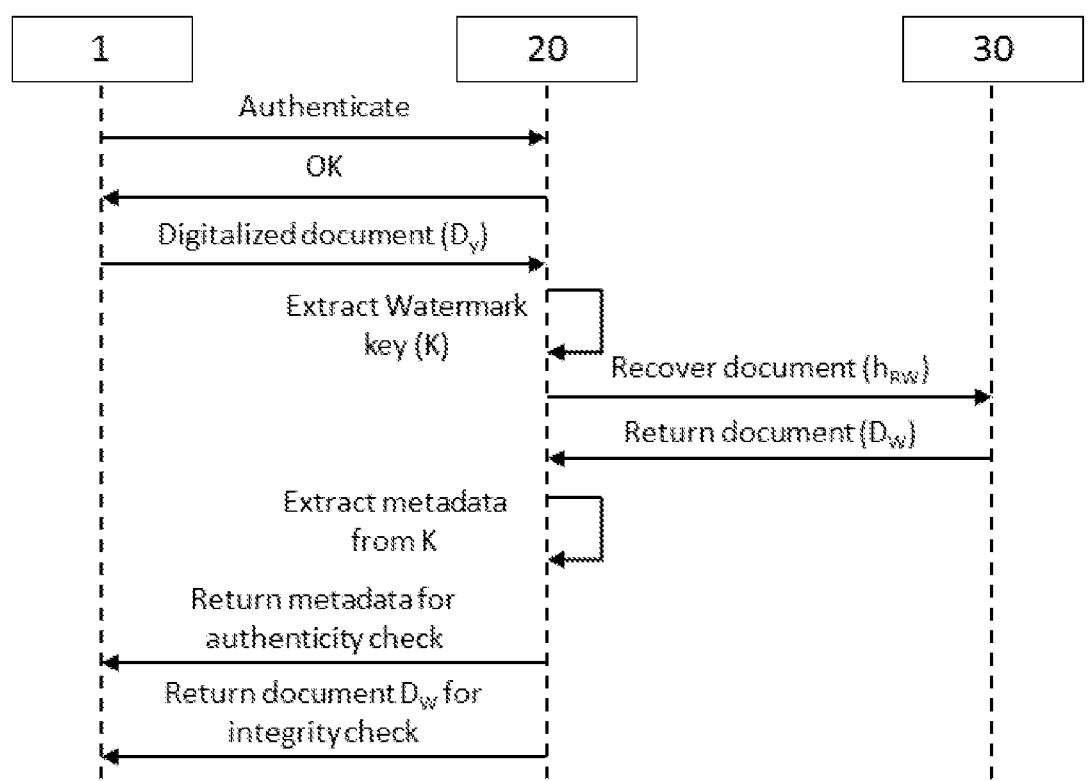
FIG. 4 is a sequence diagram of integrity and authenticity check by a user for a digitalized document.

Any final user may also, according to a third embodiment, obtain the modified document and verify anytime the authenticity and integrity of a paper or digitalized document (photo, scan, format conversion) (FIG. 4)—given that the original document has been registered using the described solution—by authenticating to the target system 20. The user 1 authentication may be based on a personal identification string (password), a security token, a mobile phone holding (including eventual restrictions to the user authentication on the basis of the mobile phone geographical location), or on a combination of more than one of the listed authentication factors. Once the authentication has been confirmed by the target service 20, the final user 1 sends the digitalized document $D_y$ to the target system 20. Then the target system 20 extracts the watermark key K from it and translates it into the key K. Then the second message digest $h_{rw}$ is used to retrieve from the DLT 30 the registered modified document $D_W$, furthermore, the available metadata is extracted from the key K including the issuer identifier, the registration timestamp and eventual other metadata included at the moment of the registration of the original document $D_0$. Finally, the obtained metadata is returned to the final user 1 for authenticity check, and the watermarked document $D_W$ is returned to the final user 1 for integrity check of the digitalized document.

The described service is implemented in an organization independent of both the issuer 10 and the final user 1, guaranteeing neutrality in their respect and constituting a trusted third party, accessible by any issuer (being it private or public) and by any user.

While the foregoing is directed to embodiments of the present invention, other and further embodiments of the invention may be devised without departing from the basic scope thereof. For example, other aspects may be implemented in hardware or software or in a combination of hardware and software.

Additionally, the software programs included as part of the invention may be embodied in a computer program product that includes a computer useable medium. For example, such a computer usable medium can include a readable memory device, such as a hard drive device, a flash memory device, a CD-ROM, a DVD/ROM, or a computer diskette, having computer readable program code segments stored thereon. The computer readable medium can also include a communications link, either optical, wired, or wireless, having program code segments carried thereon as digital or analog signals.

The scope of the present invention is determined by the claims that follow.

The invention claimed is:

1. A computer implemented method comprising:
receiving, by a second computer system, from a first computer system, a document to be certified, the document being identified in the second computer system with metadata that at least includes an identifier of the first computer system and a timestamp;
computing, by the second computer system, a first cryptographic function of the received document;
transmitting, by the second computer system, the computed first cryptographic function to a third computer system to hold within a distributed ledger;
storing, by the third computer system, the first cryptographic function in at least one memory of the third computer system;
receiving, by the second computer system, a first message digest corresponding to an identifier of having stored the first cryptographic function in the third computer system;
computing, by the second computer system, a key using the received first message digest and the metadata of the document, the computed key being decoded into a watermark which is applied to the document to provide a modified document;
transmitting, by the second computer system, the modified document to the first computer system;
computing, by the second computer system, a second cryptographic function of the modified document, and transmitting, by the second computer system, the computed second cryptographic function and the modified document to the third computer system;
storing, by the third computer system, the second cryptographic function and the modified document;
receiving, by the second computer system, a second message digest corresponding to an identifier of having stored the second cryptographic function in the third computer system, and storing the second message digest locally in the second computer system; and
transmitting, by the first computer system, the modified document to a user upon the user having been validly authenticated,
wherein the method further comprises, performing, by the second computer system:
receiving digital document from the user, and performing: (i) extracting the watermark from the received digital document, (ii) decoding, from the watermark, the key, (iii) recovering the second cryptographic function from the third computer system by providing, to the third computer system, the second message digest, (iv) extracting the metadata of the digital document from the key, (v) computing a third cryptographic function of the digital document, (vi) comparing the third cryptographic function with the second cryptographic function that was recovered from the third computer system, (vii) informing the user of a result of the comparing, and (viii) transmitting the metadata to the user; and
after the user has been validly authenticated, receiving a digitized or digitalized document from the user, and performing: (i) extracting the watermark from the received digitized or digitalized document, (ii) decoding, from the watermark, the key, (iii) extracting the metadata of the digitized or digitalized document, including the identifier of the first computer system and the timestamp from the key, and the first message digest from the key, (iv) using the first message digest to recover the first cryptographic function from the third computer system to check existence and registration of the digitized or digitalized document, and (v) transmitting a response about the existence and registration of the digitized or digitalized document in the third computer system and the extracted metadata to the user, the digitized document being a document previously printed and converted into a digital form, and the digitalized document being a digital document previously converted into a different digital format.

2. The method of claim 1, further comprising:
replicating the watermark in different points of the modified document.

3. The method of claim 2, wherein the watermark is configured to be indistinguishable to a human eye.

4. The method of claim 1, wherein the document to be certified, received by the second computer system from the first computer system, is the digital document.

5. The method of claim 1, wherein the recovering of the second cryptographic function and the extraction of the metadata are performed at a same time.

6. The method of claim 1, wherein the extraction of the metadata and the extraction of the first message digest are performed at a same time.

7. A non-transitory computer readable storage medium comprising code instructions that, when executed in at least one processor of a computer system, cause the at least one processor to implement the method of claim 1.

8. A computer implemented method comprising:

receiving, by a second computer system from a first computer system, an original document to be certified, and performing the followings:

calculating, by the second computer system, a cryptographic function of the received original document;

transmitting, by the second computer system, the calculated cryptographic function of the original document to a third computer system;

storing, by the third computer system, the cryptographic function in at least one memory of a distributed ledger such that the calculated cryptographic function of the original document is unalterable in the distributed ledger;

receiving, by the second computer system from the third computer system, a first message digest corresponding to a first identifier identifying the cryptographic function of the original document stored in the distributed ledger, and performing: (i) creating, by the second computer system, a key by combining the received first message digest, an identifier of the first computer system, and a timestamp, wherein metadata of the original document includes the identifier of the first computer system and the timestamp, (ii) creating, by the second computer system, a watermark by using the key, (iii) creating, by the second computer system, a modified document by applying the created watermark to the original document, (iv) transmitting, by the second computer system, the modified document to the first computer system, (v) calculating, by the second computer system, a cryptographic function of the modified document, (vi) transmitting, by the second computer system, the calculated cryptographic function of the modified document and the modified document to the third computer system, and (vii) holding, by the third computer system, the cryptographic function of the modified document and the modified document within the distributed ledger by storing the cryptographic function of the modified document and the modified document in the distributed ledger such that the cryptographic function of the modified document and the modified document are unalterable in the distributed ledger; and receiving, by the second computer system from the third computer system, a second message digest corresponding to a second identifier identifying the cryptographic function of the modified document and the modified document stored in the distributed ledger, and storing the second message digest locally in the second computer system;

receiving, by the second computer system, a new document that is a digital document to be authenticated from a user terminal, and performing: (i) extracting a first watermark from the received digital document, (ii) decoding, from the first extracted watermark, a key, (iii) transmitting, to the third computer system, the locally stored second message digest corresponding to the decoded key and receiving the cryptographic function of the modified document, from the third computer system, (iv) calculating a cryptographic function of the digital document, (v) comparing the cryptographic function of the digital document with the cryptographic function that has been received from the third computer system, and (vi) transmitting, to the user terminal, information of a result of the comparing; and receiving, by the second computer system, a new document that is a digitized or a digitalized document to be authenticated from the user terminal, and performing: (i) extracting a second watermark from the received digitized or digitalized document, (ii) decoding, from metadata of the second extracted watermark, a key, (iii) extracting metadata of the received digitalized or digitalized document to be authenticated, and the first message digest from the key, (iv) transmitting, to the third computer system, the first message digest corresponding to the decoded key to recover the cryptographic function of the original document from the third computer system to check existence and registration of the received digitized or digitalized document, (v) receiving a digitized or digitalized document stored in the distributed ledger in response to transmitting the first message digest, and performing the following: extracting a third watermark from the digitized or digitalized document from the distributed ledger, decoding, from the third extracted watermark, the key, using the second message digest to recover the modified document from the third computer system, extracting, by the second computer system, the metadata including the identifier of the first computer system and the timestamp from the key, and transmitting, by the second computer system to the user terminal, the extracted metadata and the recovered modified document;

wherein the digitized document is a document previously printed and converted into a digital form, and the digitalized document is a digital document previously converted into a different digital form.

9. The method of claim 8, wherein the distributed ledger is a blockchain structure.

10. The method of claim 8, wherein the cryptographic functions are each different hash functions.

\* \* \* \* \*